(12) United States Patent
Seaman et al.

(10) Patent No.: US 11,151,807 B2
(45) Date of Patent: Oct. 19, 2021

(54) METHOD AND SYSTEM FOR TRAILER TRACKING AND INVENTORY MANAGEMENT

(71) Applicant: BlackBerry Limited, Waterloo (CA)

(72) Inventors: Conrad Delbert Seaman, Ottawa (CA); Stephen West, Manotick (CA); Derek John Kuhn, Ottawa (CA)

(73) Assignee: BlackBerry Limited, Waterloo, CA (US)

( * ) Notice: Subject to any disclaimer, the term of this patent is extended or adjusted under 35 U.S.C. 154(b) by 521 days.

(21) Appl. No.: 15/662,459

(22) Filed: Jul. 28, 2017

(65) Prior Publication Data

US 2019/0035172 A1 Jan. 31, 2019

(51) Int. Cl.
| | |
|---|---|
| G07C 5/02 | (2006.01) |
| G07C 5/08 | (2006.01) |
| G01C 22/00 | (2006.01) |
| G06Q 30/06 | (2012.01) |
| G07C 5/00 | (2006.01) |

(52) U.S. Cl.
CPC .............. G07C 5/02 (2013.01); G01C 22/00 (2013.01); G06Q 30/0645 (2013.01); G07C 5/08 (2013.01); *G07C 5/006* (2013.01)

(58) Field of Classification Search
CPC ....................................................... G07C 5/02
See application file for complete search history.

(56) References Cited

U.S. PATENT DOCUMENTS

| | | | | |
|---|---|---|---|---|
| 4,743,913 | A * | 5/1988 | Takai ...................... | G01C 21/28 33/356 |
| 4,807,127 | A * | 2/1989 | Tenmoku ................ | G01C 21/30 340/988 |
| 5,416,712 | A | 5/1995 | Geier et al. | |
| 5,646,857 | A | 7/1997 | McBurney et al. | |
| 6,057,779 | A * | 5/2000 | Bates ..................... | G06Q 50/28 340/10.51 |
| 7,850,395 | B1 * | 12/2010 | Brenner ................. | G01B 21/30 404/75 |
| 8,682,622 | B1 * | 3/2014 | Brenner ................. | E01C 23/01 703/2 |

(Continued)

FOREIGN PATENT DOCUMENTS

WO 2009052056 A1 4/2009

OTHER PUBLICATIONS

International Searching Authority, International Search Report and Written Opinion for International Application No. PCT/CA2018/050899, dated Oct. 12, 2018.

(Continued)

*Primary Examiner* — Alex C Dunn
(74) *Attorney, Agent, or Firm* — Moffat & Co

(57) ABSTRACT

A method at a computing device for calculating a distance travelled, the method including receiving a plurality of discrete position fixes; determining a first distance travelled over the plurality of discrete position fixes by using a first calculation technique between successive discrete position fixes; determining a second distance travelled over the plurality of discrete position fixes by using a second calculation technique between successive discrete position fixes; applying a first weight to the first distance travelled and a second weight to the second distance travelled; and determining the distance travelled using a weighted average of the first distance travelled and the second distance travelled.

14 Claims, 9 Drawing Sheets

(56) References Cited

U.S. PATENT DOCUMENTS

| | | | |
|---|---|---|---|
| 9,963,836 B1* | 5/2018 | Brenner | E01C 19/00 |
| 2001/0053955 A1* | 12/2001 | Shirai | B60W 30/18145 |
| | | | 701/400 |
| 2005/0065722 A1* | 3/2005 | Wood | G01C 21/12 |
| | | | 701/468 |
| 2007/0210905 A1 | 9/2007 | Battista | |
| 2010/0004997 A1 | 1/2010 | Mehta et al. | |
| 2010/0262366 A1* | 10/2010 | Cao | G08G 1/20 |
| | | | 701/533 |
| 2011/0130905 A1 | 6/2011 | Mayer | |
| 2011/0238543 A1 | 9/2011 | Paez et al. | |
| 2015/0031393 A1* | 1/2015 | Post | H04W 4/025 |
| | | | 455/456.2 |
| 2016/0070000 A1* | 3/2016 | Takasuka | G01S 7/4972 |
| | | | 356/5.01 |
| 2016/0320184 A1* | 11/2016 | Long | G06T 7/50 |
| 2017/0057528 A1* | 3/2017 | Green | B61L 25/026 |
| 2017/0242093 A1* | 8/2017 | Lindgren | G01S 5/0252 |
| 2017/0278323 A1* | 9/2017 | Gupta | H04L 63/1408 |

OTHER PUBLICATIONS

Extended European Search Report, EP Application No. 18837921.8, dated Mar. 23, 2021.

Biwas Aradhya et al., "Microsegmenting: An approach for precise distance calculation for GPS based its applications", 2013 IEEE Recent Advances in Intelligent Computational Systems (RAICS), IEEE, Dec. 19, 2013, pp. 327-332, XP032569901.

Anonymous: "Inverse-variance weighting", Apr. 22, 2017, retrieved from https://en.wikipedia.org/w/index.php? title=Inverse-variance_weighting&oldid=776643630.

* cited by examiner

Trailer A .... +

Trailer B 920

| Part 922 | Mileage 924 | Date 926 |
|---|---|---|
| Brake Controller | 60000 | Feb. 15, 2020 |
| Tire 1 | 45000 | N/A |
| Tire 2 | 45000 | N/A |
| Tire 3 | 45000 | N/A |

Trailer C .... +

Central Controller 910

FIG. 9

METHOD AND SYSTEM FOR TRAILER TRACKING AND INVENTORY MANAGEMENT

FIELD OF THE DISCLOSURE

The present disclosure relates to mileage and inventory management of trailers in the transport industry.

BACKGROUND

In the transport industry, generally, the safety and maintenance of the trailer is the responsibility of the owner of the trailer, and fines and damages related to the improperly maintained trailers can be high.

Trailers may be used by their owners, or may be shared with or leased to others. Sharing or leasing may be done for a variety of reasons, such as to help companies deal with seasonal changes in product volume. For example, a department store may need many trailers at Christmas but very few in the spring. A garden supply store may, conversely, need many trailers in the spring, but very few in the winter.

In general, agreements are reached between the owners of the trailer and those leasing or sharing such trailers. Such agreements typically provide for conditions on how far the trailer may travel, and provide for guidelines with regard to the maintenance of the trailer. However, it is difficult to monitor these conditions or guidelines. In particular, it may be difficult to monitor accurately the distance that a trailer has travelled. Further, it may be difficult to ensure that any maintenance that was done by the party leasing or sharing the trailer was done properly and with proper parts.

Further, even when operated by the owner, accurate tracking of parts and mileage for a trailer may be useful to ensure that a proper maintenance schedule is maintained for the trailer itself.

BRIEF DESCRIPTION OF THE DRAWINGS

The present disclosure will be better understood with reference to the drawings, in which:

FIG. 9 is a block diagram of a central controller storing trailer parts information and maintenance information.

DETAILED DESCRIPTION OF THE DRAWINGS

Figure 1:
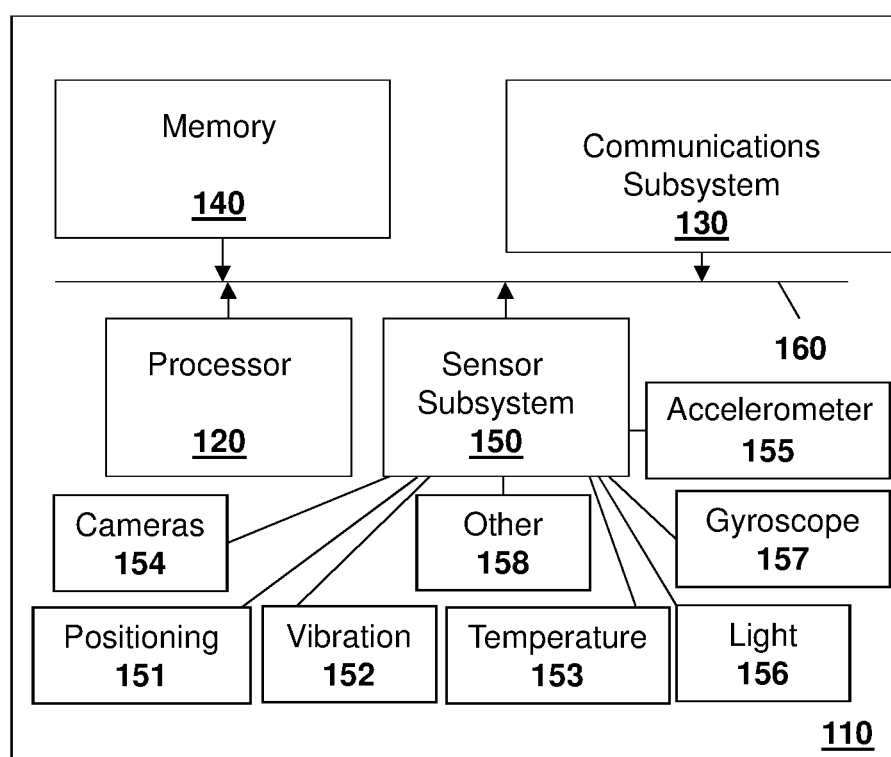
FIG. 1 is a block diagram of an example sensor apparatus for use with the embodiments of the present disclosure.

The present disclosure provides a method at a computing device for calculating a distance travelled, the method comprising: receiving a plurality of discrete position fixes; determining a first distance travelled over the plurality of discrete position fixes by using a first calculation technique between successive discrete position fixes; determining a second distance travelled over the plurality of discrete position fixes by using a second calculation technique between successive discrete position fixes; applying a first weight to the first distance travelled and a second weight to the second distance travelled; and determining the distance travelled using a weighted average of the first distance travelled and the second distance travelled.

The present disclosure further provides a computing device for calculating a distance travelled, the computing device comprising: a processor; and a communications subsystem, wherein the computing device is configured to: receive a plurality of discrete position fixes; determine a first distance travelled over the plurality of discrete position fixes by using a first calculation technique between successive discrete position fixes; determine a second distance travelled over the plurality of discrete position fixes by using a second calculation technique between successive discrete position fixes; apply a first weight to the first distance travelled and a second weight to the second distance travelled; and determine the distance travelled using a weighted average of the first distance travelled and the second distance travelled.

The present disclosure further provides a computer readable medium for storing instruction code, which, when executed by a processor of a computing device, cause the computing device to: receive a plurality of discrete position fixes; determine a first distance travelled over the plurality of discrete position fixes by using a first calculation technique between successive discrete position fixes; determine a second distance travelled over the plurality of discrete position fixes by using a second calculation technique between successive discrete position fixes; apply a first weight to the first distance travelled and a second weight to the second distance travelled; and determine the distance travelled using a weighted average of the first distance travelled and the second distance travelled.

In the embodiments described below, methods and systems are provided to track, control, and manage trailer maintenance. In particular, in accordance with the first aspect of the present disclosure, the system provides for mileage tracking for a trailer utilizing sporadic or periodic position fixes.

Currently, many trailer leasing companies use a product called a hubometer to track the number of miles a trailer has travelled. A hubometer is a device mounted on an axle of the trailer which counts the number of rotations of the axle and can be used to determine a distance from this reading. However, hubometers are expensive, break routinely and can be inaccurate.

The use of a hubometer or a trailer odometer for finding distance also relies on human operators. Specifically, the hubometer or odometer must be read by a human and in the case of rentals, the human reading the odometer or hubometer may give inaccurate, untruthful or non-timely results.

Thus, in accordance with the present disclosure, a trailer tracking system may be utilized to provide a mileage tracking application in accordance with the disclosure below.

In a further aspect of the present disclosure, a parts inventory may be maintained for the main wearable parts of the trailer platform. Specifically, any part which may wear out and thus need replacement may be tracked through a reporting system.

Data about such parts can be attained in a few ways. First, the data may come from a wired bus such as a Control Area Network Bus (CanBUS) of the trailer. The CanBUS may report control units installed on the trailer and may report changes to those control units.

A control unit change may mean that a part has been swapped out. For example, if a brake controller is attached to the CanBUS, it can report a unique identity. If the brake controller is replaced, then the reported identity will be different.

In other embodiments, data may come from sensors such as a tire pressure monitoring systems or tire wear sensors or brake wear sensors or strain gauges or air pressure systems. This data may be reported from the sensors utilizing a short-range communication technology, including both wired or wireless technologies such as Bluetooth™, ZigBee, near field communications (NFC), radio frequency identifier (RFID), Ethernet, or other similar techniques. In some cases, the sensors may use other technologies such as cellular or Wi-Fi.

Detection of a change based on these sensors may be done in various ways. In one embodiment, if a trailer has 16 wheels with tire pressure monitoring sensors (TPMS) installed, it may expect those sensors to report in periodically. If one or more of the TPMS sensors fails to report in, the sensor may be dead or the wheel may have been inappropriately changed.

Thus reports from unknown sensors or control units, or failure to report from known sensors may be used to determine that inventory changes have been made to the trailer.

In a further aspect of the present disclosure, tracking of maintenance and scheduled maintenance may also be enhanced utilizing the systems and embodiments described herein.

One example of a sensor apparatus is provided below. In vehicle operations, sensor systems may be included on the vehicle and include a plurality of sensor apparatuses operating remotely from a central monitoring station to provide remote sensor data to a management or monitoring hub. For example, one sensor system involves fleet management or cargo management systems. In fleet management or cargo management systems, sensors may be placed on a trailer, shipping container or similar product to provide a central station with information regarding the container. Such information may include, but is not limited to, information concerning the current location of the trailer or shipping container, the temperature inside the shipping container or trailer, or that the doors on the shipping container or trailer are closed, whether a sudden acceleration or deceleration event has occurred, the tilt angle of the trailer or shipping container, among other data.

In other embodiments the sensor apparatus may be secured to a vehicle itself. As used herein, the term vehicle can include any motorized vehicle such as a truck, tractor, car, boat, motorcycle, snow machine, among others, and can further include a trailer, shipping container or other such cargo moving container, whether attached to a motorized vehicle or not.

In accordance with the embodiments described herein, a sensor apparatus may be any apparatus that is capable of providing data or information from sensors associated with the sensor apparatus to a central monitoring or control station. Sensors associated with the sensor apparatus may either be physically part of the sensor apparatus, for example a built-in global positioning system (GPS) chipset, or may be associated with the sensor apparatus through short range wired or wireless communications. For example, a tire pressure monitor may provide information through a Bluetooth™ Low Energy (BLE) signal from the tire to the sensor apparatus. In other cases, a camera may be part of the sensor apparatus or may communicate with a sensor apparatus through wired or wireless technologies. Other examples of sensors are possible.

A central monitoring station may be any server or combination of servers that are remote from the sensor apparatus. The central monitoring station can receive data from a plurality of sensor apparatuses, and in some cases may have software to monitor such data and provide alerts to operators if data is outside of the predetermined boundaries.

One sensor apparatus is shown with regard to FIG. 1. The sensor apparatus of FIG. 1 is however merely an example and other sensor apparatuses could equally be used in accordance with the embodiments of the present disclosure.

Reference is now made to FIG. 1, which shows an example sensor apparatus 110. Sensor apparatus 110 can be any computing device or network node. Such computing device or network node may include any type of electronic device, including but not limited to, mobile devices such as smartphones or cellular telephones. Examples can further include fixed or mobile devices, such as internet of things devices, endpoints, home automation devices, medical equipment in hospital or home environments, inventory tracking devices, environmental monitoring devices, energy management devices, infrastructure management devices, vehicles or devices for vehicles, fixed electronic devices, among others.

Sensor apparatus 110 comprises a processor 120 and at least one communications subsystem 130, where the processor 120 and communications subsystem 130 cooperate to perform the methods of the embodiments described herein. Communications subsystem 130 may, in some embodiments, comprise multiple subsystems, for example for different radio technologies.

Communications subsystem 130 allows sensor apparatus 110 to communicate with other devices or network elements. Communications subsystem 130 may use one or more of a variety of communications types, including but not limited to cellular, satellite, Bluetooth™, Bluetooth™ Low Energy, Wi-Fi, wireless local area network (WLAN), near field communications (NFC), ZigBee, wired connections such as Ethernet or fiber, among other options.

As such, a communications subsystem 130 for wireless communications will typically have one or more receivers and transmitters, as well as associated components such as one or more antenna elements, local oscillators (LOs), and may include a processing module such as a digital signal processor (DSP). As will be apparent to those skilled in the field of communications, the particular design of the communication subsystem 130 will be dependent upon the communication network or communication technology on which the sensor apparatus is intended to operate.

Processor 120 generally controls the overall operation of the sensor apparatus 110 and is configured to execute programmable logic, which may be stored, along with data, using memory 140. Memory 140 can be any tangible, non-transitory computer readable storage medium, including but not limited to optical (e.g., CD, DVD, etc.), magnetic (e.g., tape), flash drive, hard drive, or other memory known in the art.

Alternatively, or in addition to memory 140, sensor apparatus 110 may access data or programmable logic from an external storage medium, for example through communications subsystem 130.

In the embodiment of FIG. 1, sensor apparatus 110 may utilize a plurality of sensors, which may either be part of sensor apparatus 110 in some embodiments or may communicate with sensor apparatus 110 in other embodiments. For internal sensors, processor 120 may receive input from a sensor subsystem 150.

Examples of sensors in the embodiment of FIG. 1 include a positioning sensor 151, a vibration sensor 152, a temperature sensor 153, one or more image sensors 154, accelerometer 155, light sensors 156, gyroscopic sensors 157, and other sensors 158. Other sensors may be any sensor that is capable of reading or obtaining data that may be useful for sensor apparatus 110. However, the sensors shown in the embodiment of FIG. 1 are merely examples, and in other embodiments different sensors or a subset of sensors shown in FIG. 1 may be used.

Communications between the various elements of sensor apparatus 110 may be through an internal bus 160 in one embodiment. However, other forms of communication are possible.

Sensor apparatus 110 may be affixed to any fixed or portable platform. For example, sensor apparatus 110 may be affixed to shipping containers, truck trailers, truck cabs in one embodiment. In other embodiments, sensor apparatus 110 may be affixed to any vehicle, including motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising, among others.

In other cases, sensor apparatus 110 could be carried by a user.

In other cases, sensor apparatus 110 may be affixed to stationary objects including buildings, lamp posts, fences, cranes, among other options.

Such sensor apparatus 110 may be a power limited device. For example sensor apparatus 110 could be a battery operated device that can be affixed to a shipping container or trailer in some embodiments. Other limited power sources could include any limited power supply, such as a small generator or dynamo, a fuel cell, solar power, among other options.

In other embodiments, sensor apparatus 110 may utilize external power, for example from the engine of a tractor pulling the trailer, from a land power source for example on a plugged in recreational vehicle or from a building power supply, among other options.

External power may further allow for recharging of batteries to allow the sensor apparatus 110 to then operate in a power limited mode again. Recharging methods may also include other power sources, such as, but not limited to, solar, electromagnetic, acoustic or vibration charging.

The sensor apparatus from FIG. 1 may be used in a variety of environments. One example environment in which the sensor apparatus may be used is shown with regard to FIG. 2.

Figure 2:
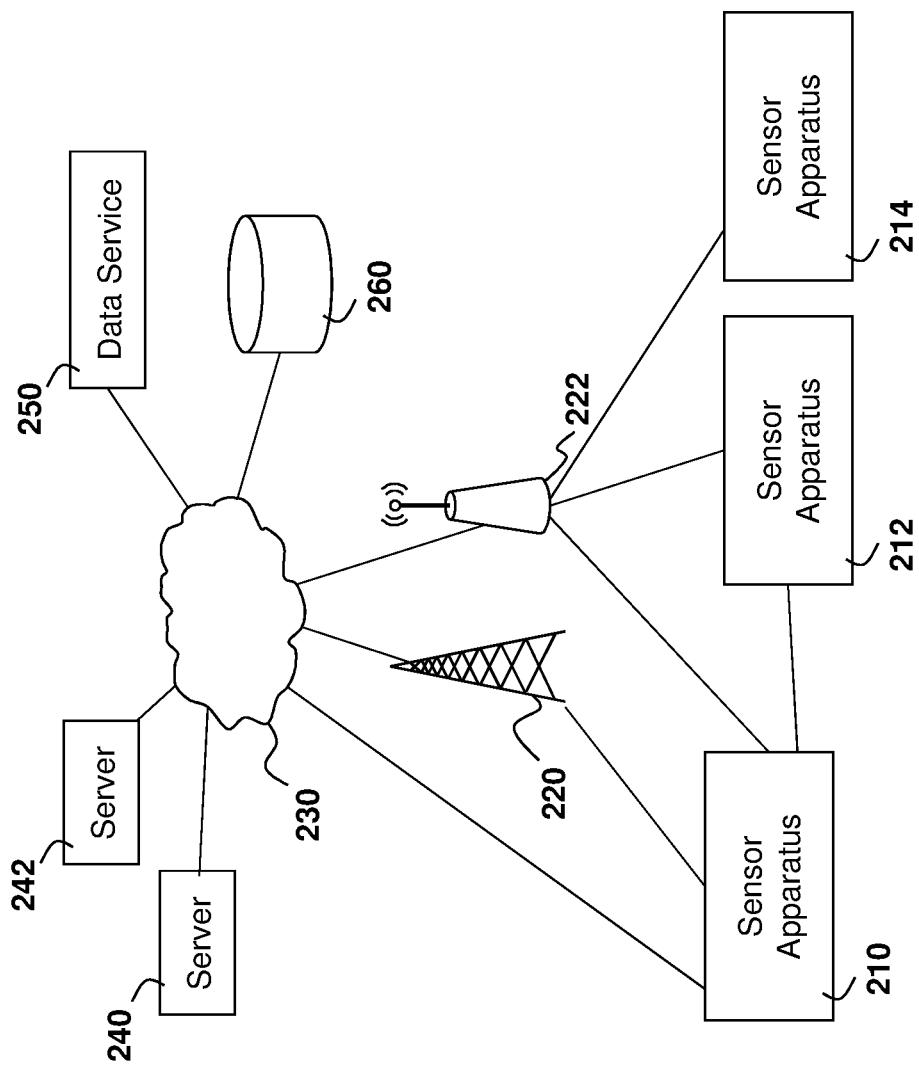
FIG. 2 is a block diagram showing an example environment for a sensor apparatus in accordance with the embodiments of the present disclosure.

Referring to FIG. 2, three sensor apparatuses, namely sensor apparatus 210, sensor apparatus 212, and sensor apparatus 214 are provided.

In the example of FIG. 2, sensor apparatus 210 may communicate through a cellular base station 220 or through an access point 222. Access point 222 may be any wireless communication access point.

Further, in some embodiments, sensor apparatus 210 could communicate through a wired access point such as Ethernet or fiber, among other options.

The communication may then proceed over a wide area network such as Internet 230 and proceed to servers 240 or 242.

Similarly, sensor apparatus 212 and sensor apparatus 214 may communicate with servers 240 or server 242 through one or both of the base station 220 or access point 222, among other options for such communication.

In other embodiments, any one of sensors 210, 212 or 214 may communicate through satellite communication technology. This, for example, may be useful if the sensor apparatus is travelling to areas that are outside of cellular coverage or access point coverage.

In other embodiments, sensor apparatus 212 may be out of range of access point 222, and may communicate with sensor apparatus 210 to allow sensor apparatus 210 to act as a relay for communications.

Communication between sensor apparatus 210 and server 240 may be one directional or bidirectional. Thus, in one embodiment sensor apparatus 210 may provide information to server 240 but server 240 does not respond. In other cases, server 240 may issue commands to sensor apparatus 210 but data may be stored internally on sensor apparatus 210 until the sensor apparatus arrives at a particular location. In other cases, two-way communication may exist between sensor apparatus 210 and server 240.

A server, central server, processing service, endpoint, Uniform Resource Identifier (URI), Uniform Resource Locator (URL), back-end, and/or processing system may be used interchangeably in the descriptions herein. The server functionality typically represents data processing/reporting that are not closely tied to the location of movable image capture apparatuses 210, 212, 214, etc. For example, the server may be located essentially anywhere so long as it has network access to communicate with image capture apparatuses 210, 212, 214, etc.

Server 240 may, for example, be a fleet management centralized monitoring station. In this case, server 240 may receive information from sensor apparatuses associated with various trailers or cargo containers, providing information such as the location of such cargo containers, the temperature within such cargo containers, any unusual events including sudden decelerations, temperature warnings when the temperature is either too high or too low, among other data. The server 240 may compile such information and store it for future reference. It may further alert an operator. For example, a sudden deceleration event may indicate that a trailer may have been in an accident and the operator may need to call emergency services and potentially dispatch another tractor to the location.

In other embodiments, server 240 may be a trailer tracking and maintenance server which is used to determine how far a trailer has traveled and whether any parts of the trailer need to be maintained.

Other examples of functionality for server 240 are possible.

In the embodiment of FIG. 2, servers 240 and 242 may further have access to third-party information or information from other servers within the network. For example, a data services provider 250 may provide information to server 240. Similarly, a data repository or database 260 may also provide information to server 240.

For example, data services provider 250 may be a subscription based service used by server 240 to obtain current road and weather conditions.

Data repository or database 260 may for example provide information such as image data associated with a particular location, aerial maps, detailed street maps, or other such information.

The types of information provided by data service provider 250 or the data repository or database 260 is not limited to the above examples and the information provided could be any data useful to server 240.

In some embodiments, information from data service provider 250 or the data repository from database 260 can be provided to one or more of sensor apparatuses 210, 212, or 214 for processing at those sensor apparatuses.

A sensor apparatus such as that described in FIGS. 1 and 2 above may be used mileage tracking in a first aspect of the present disclosure, and for inventory and parts maintenance in other aspects of the present disclosure.

Specifically, utilizing a sensor apparatus such as that described with regard to FIGS. 1 and 2 above, a position sensor may be used to determine a location of the trailer. However, since the sensor apparatus may be a power limited device, the position sensor may only be used periodically or at discrete time intervals, as opposed to continuously to conserve battery power. As such, position fixes may be only periodically available. For example, in some cases a position fix is only taken every five minutes. In other cases, a position fix may be taken only every 15 minutes. Other examples are possible.

Furthermore, the positioning system may not be completely accurate. Specifically, in many cases, a global positioning system fix may only be accurate to within one, ten or even one hundred meters, depending on the quality of the fix.

Furthermore, a position fix may not be obtainable in every circumstance. For example, in a dense urban area a global positioning system (GPS) receiver may be unable to lock onto one or more satellites in the window provided for obtaining the position fix. Thus, even if the position fix is attempted every five minutes, in some instances the position may be unobtainable in some of the periods.

Based on the above circumstances, maintaining the mileage of a trailer using such positioning system may be difficult.

In accordance with the embodiments described below, a plurality of techniques may be used to determine the distance based on periodic or discrete position fixes. Further, the plurality of techniques may then be combined to find a distance travelled with generally higher accuracy.

Four measurement techniques are described below. These include a straight-line technique, a road based routing technique, a road based matrix technique, and a bias confirmation technique.

Straight-Line Technique

Using a straight-line technique, a shortest distance between successive GPS fixes can be determined. Thus, the straight-line technique produces a minimum distance that the trailer could have travelled.

Figure 3:
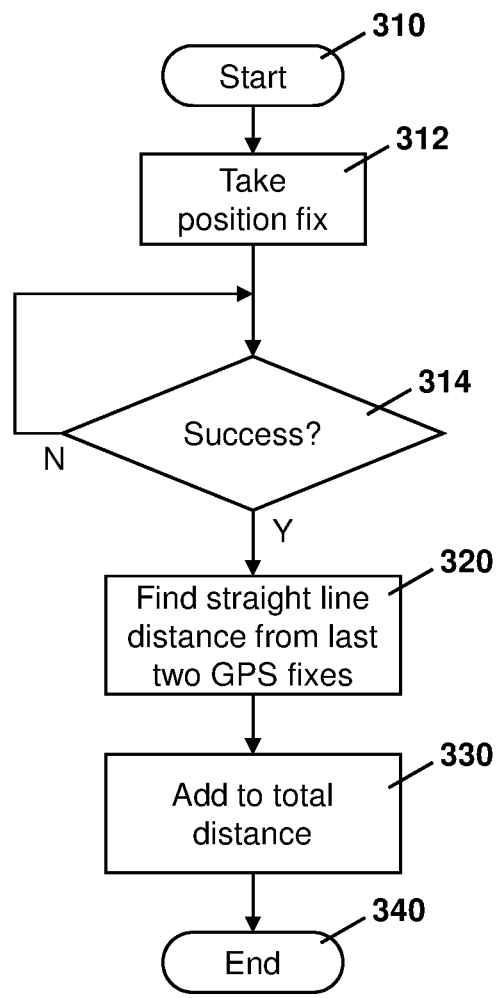
FIG. 3 is a process diagram showing a process for calculating a distance based on a straight-line calculation.

In particular, reference is now made to FIG. 3, which shows a process for obtaining a straight-line measurement. The process of FIG. 3 starts at block 310 and proceeds to block 312 in which a position fix is taken. As will be appreciated by those in the art, the position fix may be taken periodically or at discrete intervals, and may not be continuously taken. For example, as described above, the position fix may be taken every five minutes.

Once the position fix is taken at block 312, the process proceeds to block 314 in which a check is made to determine whether or not the fix was successful. For example, if a GPS receiver on the sensor apparatus was unable to lock to a satellite during this reading cycle, the position fix may be unsuccessful. In this case, the process proceeds back to block 312 in which a further position fix may be taken. The further position fix may, for example, be taken at the next scheduled time for taking such a position fix in order to avoid a battery drain on the sensor apparatus.

From block 314, if the position fix was successfully taken, the process proceeds to block 320 in which a calculation is made to determine the straight-line distance from the last successful position fix to the current successful position fix.

In one embodiment, the calculation may utilize the haversine formula to calculate the distance between two points on a spherical surface. In other cases, the spherical law of cosines formula may be utilized to calculate the straight-line distance. In other cases, the Vincenty formula may also be used for calculating the straight-line distance. In other cases, an approximation using Pythagoras' theorem on an equirectangular projection or a polar coordinate flat-earth formula may be used. Other similar formulas could also be used.

From block 320 the process proceeds to block 330, in which the straight-line distance is added to the total distance being measured. Such total distance may be the distance driven for a particular trip, for a particular day, for a trailer in general, among other options.

From block 330 the process proceeds to block 340 and ends.

While the embodiment of FIG. 3 shows a calculation on the fly, in other cases the successful position fixes may simply be stored and a straight-line calculation may be performed at a future time on the points. This may, for example, be done on a server to which the position fixes are uploaded.

As such, the method of FIG. 3 can utilize a series of points to calculate the straight-line distance between such points in order to determine the distance travelled by the trailer.

Road Based Routing Technique

In a further distance measurement technique, road based routing may be utilized to determine the distance between successive position fixes. In road based routing, the position fixes are snapped to a road map by determining the most likely route between the two points on such map.

Figure 4:
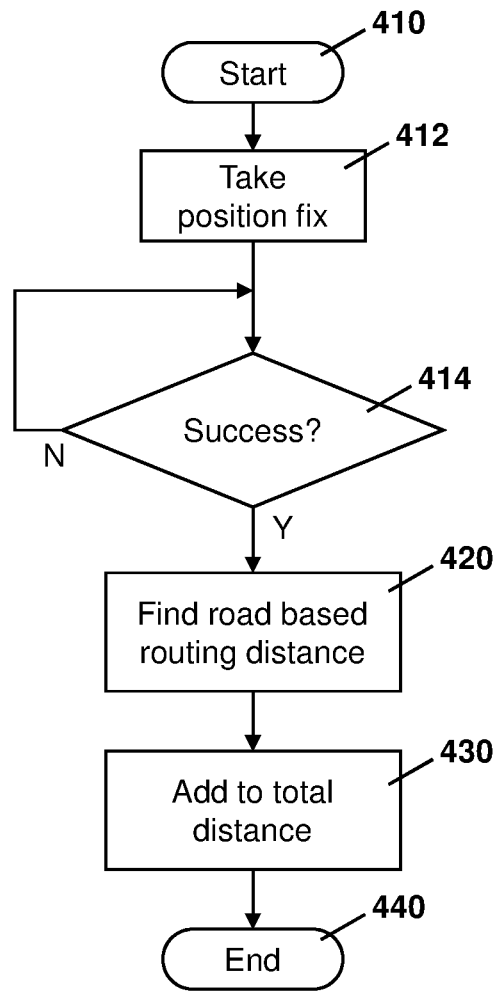
FIG. 4 is a process diagram showing a process for calculating a distance based on a road based routing calculation.

Reference is now made to FIG. 4. The process of FIG. 4 starts at block 410 and proceeds to block 412 in which a position fix is taken.

The process then proceeds to block 414 in which a check is made to determine whether the position fix was successful. Such check may be similar to the check made at block 314 in FIG. 3 above.

If the position fix is not successful, the process proceeds back to block 412. Otherwise the process proceeds to block 420.

At block 420, the distance between the last successful position fix and the current position fix is found utilizing road based routing. In particular, either based on the data accumulated by the company itself or utilizing a third-party data such as a mapping database or application, a computing determination may be made to find the most likely route taken between the two points.

For example, the most likely route may utilize major roads rather than side roads when possible. In some cases, the route may estimate that the easiest path between the two points was a used, and therefore use a route that minimizes that the number of turns. In other cases, more complex algorithms may be used to find the likely route.

Utilizing such road based routing, the route could be snapped to one or more roads between the last two points and the distance between those two points could be found utilizing the map data.

From block 420 the process proceeds to block 430, in which the road based routing distance is added to the total distance being measured. Such total distance may be the distance driven for a particular trip, for a particular day, for a trailer in general, among other options.

From block 430 the process proceeds to block 440 and ends.

Again, while the embodiment of FIG. 4 shows a calculation on the fly, in other cases the successful position fixes may simply be stored and a road based routing calculation may be performed at a future time on the points. This may, for example, be done on a server to which the position fixes are uploaded.

As such, the method of FIG. 4 can utilize a series of points to calculate the road based routing distance between such points in order to determine the distance travelled by the trailer.

Road Based Matrix Technique

In a further distance measurement mechanism, a road based matrix may be utilized. This technique utilizes a plurality of position fixes to map the route between a start and an end point for the trailer. By utilizing a matrix of points, a more accurate picture of the route may be determined. For example, bad position fixes that are erroneous can be found and filtered out.

Figure 5:
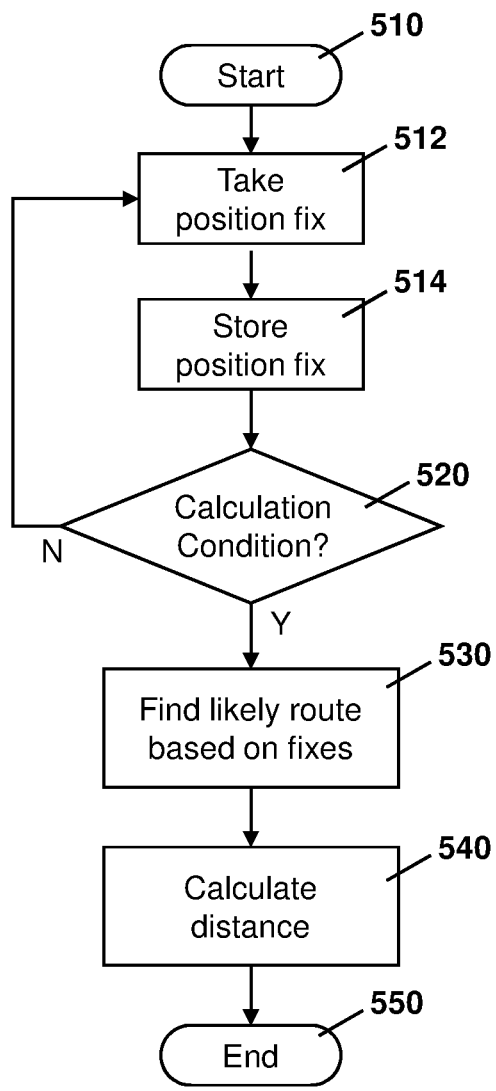
FIG. 5 is a process diagram showing a process for calculating a distance based on a road based matrix calculation.

Thus, reference is now made to FIG. 5. The process of FIG. 5 starts at block 510 and proceeds to block 512 in which a position fix is taken.

The process then proceeds to block 514 in which the position fix is stored.

The process then proceeds to block 520 in which a check is made to determine whether a condition for calculation has been met. For example, the matrix based routing may only be activated when a certain time threshold has elapsed. For example, the road based matrix may only be activated every six hours.

In other cases, the calculation condition may be a number of position fixes. Thus, the number of stored position fixes at block 514 may need to exceed a threshold at block 520.

In other embodiments, the condition may be based on whether or not the trailer is moving. For example, if the trailer is stopped for a predetermined time, then it may indicate that the trailer has reached a final destination and road based matrix calculations may be made.

In other embodiments, the condition may be based on communication with a server to upload position fixes.

Other examples of conditions at block 520 would be evident to those skilled in the art.

From block 520, if the condition has not been met and the process proceeds back to block 512 in which position fixes continue to be taken. For example, the position fix may be taken every five minutes as described above.

Once the condition at block 520 is met the process proceeds to block 530 in which a most likely route between a start and an end point is found. This may be done by snapping the position points to major roads or other secondary roads on the path. Likelihood metrics for the path can be used to find the most likely path. Erroneous position fixes may be filtered out in some cases. In this way, a likely route is found between and started in points.

The process then proceeds to block 540 in which the distance between the start and end points along the route calculated at block 530 is found.

From block 540 the process proceeds to block 550 and ends.

Bias Confirmation Technique

In a further technique, secondary sources may be added to GPS fixes to provide for increased accuracy.

In one case, a secondary source may be a mobile device carried by a driver pulling the trailer. In another case the secondary source may be an in-cab GPS unit that is connected to the truck's power system and therefore can continually update its GPS positioning. In other cases, confirmatory sensors such as odometer readings from the truck cab among other such information may also be used.

Figure 6:
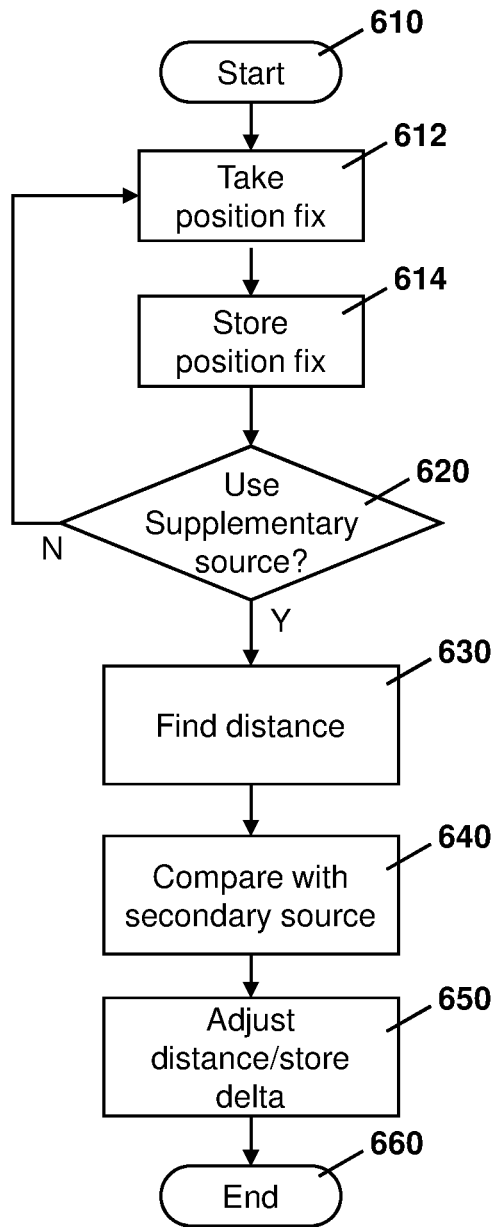
FIG. 6 is a process diagram showing a process for calculating a distance based on a bias confirmation calculation.

Reference is now made to FIG. 6, in which the process starts at block 610.

The process then proceeds to block 612 in which a position fix is taken.

From block 612 the process then proceeds to block 614 in which a successful position fix is stored.

From block 614 the process proceeds to block 620 in which a determination is made on whether supplementary sources should be compared to the position data. The check at block 620 may, for example, determine if enough position fixes are stored to make the comparison worthwhile. The check may also determine whether bad position fixes have occurred recently. Other options are however possible.

If the check determines that supplementary sources should not be used, the process proceeds back to block 612 in which further position fixes are taken and stored.

From block 620, if supplementary sources should be used, the process proceeds to block 630 in which a distance from the stored position fixes is calculated. The calculation at block 630 may use any of the embodiments of FIG. 3, 4, or 5 above, for example.

From block 630 the process proceeds to block 640 in which the calculated distance is compared with the distance calculated using one or more secondary sources. For example, a mobile device or tractor may be queried through a wired or wireless technologies to determine the distance calculated by these devices, for example using positioning technologies on those devices. Similarly, the odometer may be part of the calculation and may be queried by the sensor apparatus. Other options are possible.

From block 640 the process proceeds to block 650 in which the distance may be adjusted up or down, or a delta between the calculated distance and the secondary source may stored for future processing.

The process then proceeds to block 660 and ends.

Combining Techniques

The above the techniques for finding the distance travelled by a trailer may, in some embodiments, be combined to provide a more accurate distance travelled by the trailer. For example, two or more of the techniques described with regard to FIGS. 3 to 6 may be combined to provide a better distance measurements.

Specifically, for long distance travel, the road based and road matrix techniques of FIG. 4 or 5 may be highly accurate and therefore a calculation for trailer distance can bias such values heavily.

Conversely, in cities or heavy traffic situations, the straight line distance and bias confirmation may be more accurate due to position finding inaccuracy, and in this case the straight line or the bias confirmation techniques could be weighed more heavily.

In still further embodiments, the route may be broken based on urban versus highway driving and the threshold speed of the movement and the different parts of the route may be biased differently using the different techniques above.

For example, on a trip, a truck is pulling a trailer from a facility in one city to a facility in another city. During the trip the trailer is caught in a traffic jam due to road construction. In this case, the trip may be broken into segments as shown in Table 1 below:

TABLE 1

Segments Of Trip

| Segment | Description |
|---|---|
| Segment 1 | Trailer departs facility, proceeds through urban area, until trailer enters highway |
| Segment 2 | Trailer enters highway until trailer encounters traffic jam and speed drops below threshold |
| Segment 3 | During traffic jam when speed remains under a threshold |
| Segment 4 | Speed increases over threshold after traffic jam until trailer leaves highway |
| Segment 5 | Trailer leaves highway until trailer reaches facility |

In accordance with Table 1 above, a trip is shown with five segments. The example of Table 1 is merely provided for illustration, and a real-world trip could be broken into many segments. The different segments may be based on speed thresholds, geographic locations, among other options.

In one example, the different segments may be biased individually. Therefore, if two measurement techniques are being used, a straight-line technique and a road based routing technique, each might be assigned a weight. For example, each segment may be calculated using Equation 1 below:

$$\text{Distance} = \frac{A(\text{Straight}-\text{line}_{segment}) + B(\text{Road}-\text{based}_{segment})}{A+B} \quad (1)$$

Where A and B are biasing or weighting values and Straight-line$_{segment}$ refers to the straight-line distance calculated for the segment and Road-based$_{segment}$ refers to the distance calculated for the segment using the road based routing technique.

Using equation 1 above, the values of A and B can be varied based on factors such as speed or location. Thus, in segment 1 from Table 1 above, the slow speed and urban environment may favor a straight-line technique, and based on this, the value of A is set higher than the value of B.

Similarly, in segment 2, the road based routing technique may be favorable and therefore the value of B might be set higher than the value of A.

Further, in segment 3 where the speed is very low, the straight line technique can be significantly favored, and in this case the value of A might be much higher than B, and may be different from the values used in segment 1.

Other options are possible.

Thus using equation 1 and the different bias values for each segment, the accuracy of the distance tracking can be improved.

If all four techniques were used, equation 1 can be modified to have bias values for each technique. Thus equation 2 could be used:

$$\text{Distance} = \frac{A(\text{Straight}-\text{line}_{seg}) + B(\text{Road}-\text{based}_{seg}) + C(\text{Road}-\text{matrix}_{seg}) + D(\text{Bias}_{seg})}{A+B} \quad (2)$$

Similarly, if only 3 of the techniques were used, then the three values could be biased for each segment.

Equations 1 and 2 above are only examples of how the distances could be combined and weighted to produce a distance measurement. Other formulas could equally be used having regard to the embodiments described herein.

Figure 7:
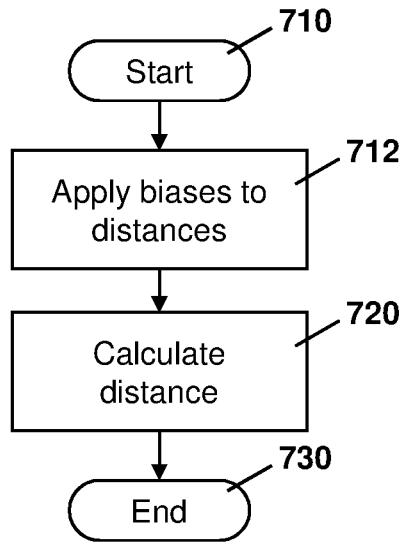
FIG. 7 a process diagram showing the combination of calculated distances with a bias factor to calculate distance.

The above is illustrated in FIG. 7. The process of FIG. 7 starts at block 710 and proceeds block 712 in which a bias is applied to the distance measurement found using the various techniques. The bias may be applied to the measurements for the entire route or to segments of the total route, depending on the categorization of the segment.

Once the biases are applied the process proceeds to block 720 in which the distance is calculated utilizing the biased values. For example, a weighted average may be provided between the various calculation techniques to provide the final distance travelled.

From block 720 the process proceeds to block 730 and ends.

Therefore, utilizing the above techniques, a distance measurement with a higher likely accuracy may be found utilizing periodic or discrete position readings.

The calculation of the distances and each of the techniques could be performed at either or both of the sensor apparatus or on a network server. For example, the sensor apparatus may periodically report to the network server its current location. This may be one or multiple position fixes. The network server may therefore know the position fixes and apply the techniques of FIGS. 3 to 7 to obtain the distance travelled.

In other embodiments the data may be stored on the sensor apparatus until the sensor apparatus reaches a predetermined location, at which point it can provide all of the position fixes to the network server.

In other cases, mapping information may be stored on the sensor apparatus and the calculations may be performed on the sensor apparatus itself.

In still other cases, the sensor apparatus may access, through its communications subsystem, external resources such as mapping resources, and do the calculations on the sensor apparatus itself.

Further, in some cases some of the calculations can be performed on the sensor apparatus and others of the calculations can be performed on the network server.

Based on the above, trailer distance can be tracked.

Parts Inventory

In accordance with a further embodiment of the present disclosure, a maintenance tracking program has awareness and control of updates for the main wearable parts of the platform. Such awareness allows for inventory control.

Parts data can be obtained in several ways. As provided above, the data may come from the CanBus or other bus on the trailer, or may be communicated with the sensor apparatus through wired or wireless techniques, among other options.

Thus, in accordance with one embodiment the present disclosure, the sensor apparatus may know keys for authenticating the various components on the trailer.

Figure 8:
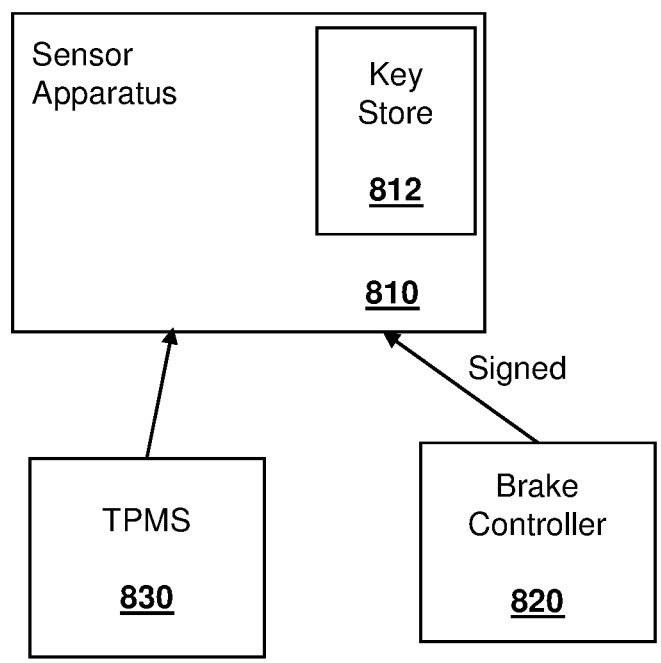
FIG. 8 a block diagram showing a sensor apparatus communicating with parts on a trailer.

Reference is now made to FIG. 8. In the embodiment of FIG. 8, sensor apparatus 810 includes a key store 812 which may store the keys for each of the components that sensor apparatus communicates with. For example, the key for the brake controller may be known at sensor apparatus 810. Therefore, if communications are received from the brake controller, such communications may be signed by the brake controller and the sensor apparatus 810 may therefore utilize key store 812 to verify the identity of the brake controller.

Conversely, if a communication arrives from a brake controller that is either not signed or signed by a key that is different than the key stored at sensor apparatus 810, the sensor apparatus 810 may know that the brake controller has been replaced and report such information to a central monitoring station.

In other embodiments, replacement parts may not respond to queries by the sensor apparatus. For example, the sensor apparatus 810 may be expecting data from a tire pressure monitoring system in each tire. The TPMS 830 may, for example, provide periodic reports to sensor apparatus 810.

Sensor apparatus 810 may expect such reports and if the TPMS 830 fails to send a report for a particular number of cycles, then the sensor apparatus 810 may assume that either the TPMS sensor is dead or that the wheel within which the TPMS sensor is located is has been inappropriately changed. Again, an alert may be sent to a monitoring station.

Maintenance Alerts

In a further embodiment of the present disclosure, the mileage and parts inventory may be used to create a usage-based maintenance alert system. Thus, a central controller 910 in FIG. 9 may store a list of trailers, the components installed in such trailers, and the mileage needed to perform maintenance on each part.

Further, the mileage for the trailer may be updated and when it reaches one of the thresholds, an alert may be generated for that trailer.

For example, the central controller 910 may keep a table for trailer 920 with a list of parts 922 installed on the trailer. Each part could have a mileage threshold 924 for performing maintenance. Further, a part may have a date threshold 926 by which point maintenance should be performed, regardless of mileage.

Thereafter, once the mileage for trailer 920 is updated, a check may be made to determine whether any mileage or date thresholds have been exceeded. If yes, then controller 910 may generate an alert that the trailer needs to be maintained.

In further embodiments, the table may be expanded for other data such as actual miles used, actual wear status, expected next maintenance cycle, regulatory limits, part wear warranties or expectations, among other data. Such additional data may be used to customize the maintenance program for the trailer.

Using data from all these points, the maintenance cycle of the trailer can be optimized. For example, a regulation may be set the trailers must be inspected every 10,000 miles. However, at the same time, higher wear may be seen on the brake pad then a supplier predicts based on normal use. This may signal a discrepancy that can specifically be investigated on the next maintenance cycle.

Based on the above, inventory tracking and maintenance cycles can be performed on trailers.

The server performing the embodiments above may be any network based server or combination of servers. One simplified server that may be used is provided with regards to FIG. 10.

Figure 10:
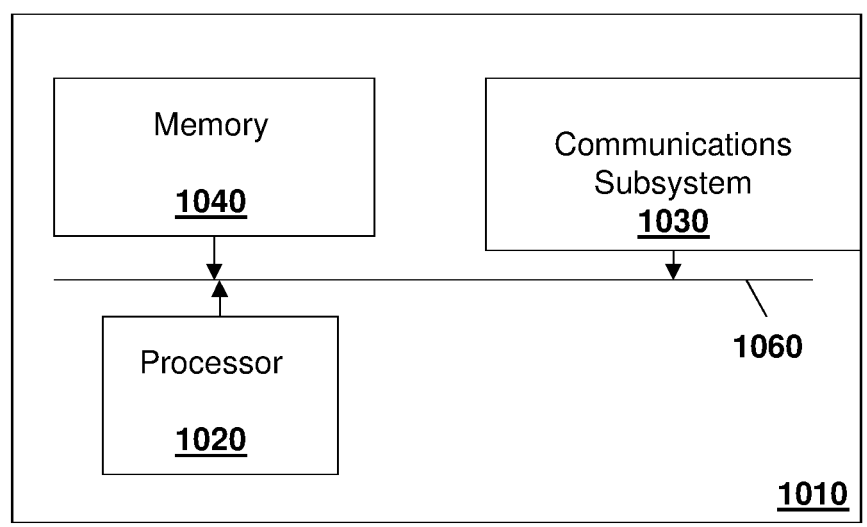
FIG. 10 is a block diagram of an example simplified computing device that may be used with the embodiments of the present disclosure.

In FIG. 10, server 1010 includes a processor 1020 and a communications subsystem 1030, where the processor 1020 and communications subsystem 1030 cooperate to perform the methods of the embodiments described herein.

Processor 1020 is configured to execute programmable logic, which may be stored, along with data, on server 1010, and shown in the example of FIG. 10 as memory 1040. Memory 1040 can be any tangible, non-transitory computer readable storage medium, such as optical (e.g., CD, DVD, etc.), magnetic (e.g., tape), flash drive, hard drive, or other memory known in the art.

Alternatively, or in addition to memory 1040, server 1010 may access data or programmable logic from an external storage medium, for example through communications subsystem 1030.

Communications subsystem 1030 allows server 1010 to communicate with other devices or network elements.

Communications between the various elements of server 1010 may be through an internal bus 1060 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Except where otherwise described as such, a server, central server, service, processing service, endpoint, Uniform Resource Identifier (URI), Uniform Resource Locator (URL), back-end, and/or processing system may be used interchangeably in the descriptions and examples herein. Mesh networks and processing may also be used alone or in conjunction with other types as well as fog computing. Moreover, communication may be from device to device, wherein they may use low power communication (e.g., Bluetooth, Wi-Fi), and/or a network, to communicate with other devices to get information.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a computing device for calculating a distance travelled, to monitor maintenance of a vehicle, the method comprising:
receiving a plurality of discrete position fixes from a position sensor;
defining a plurality of segments from the plurality of discrete position fixes based on a speed threshold;
for each segment, determining a first distance travelled by using a first calculation technique between successive discrete position fixes;
for each segment, determining a second distance travelled by using a second calculation technique between successive discrete position fixes;
for each segment, applying a first weight to the first distance travelled and a second weight to the second distance travelled; and
for each segment, determining the distance travelled using a weighted average of the first distance travelled and the second distance travelled wherein the first weight and the second weight are determined based on a speed traveled during the segment;
wherein the distance travelled is updated to determine whether distance thresholds are exceeded to generate an alert that maintenance is needed.

2. The method of claim 1, wherein the first calculation technique is a straight-line calculation between successive position fixes.

3. The method of claim 1, wherein the second calculation technique is a technique selected from a road based routing technique; a road based matrix technique; or a bias confirmation technique.

4. The method of claim 1, further comprising:
determining a third distance travelled over the plurality of discrete position fixes by using a third calculation technique between successive discrete position fixes;
applying a third weight to the third distance travelled; and
using the weighted third distance travelled in the weighted average calculation.

5. The method of claim 4, further comprising calculating a total distance by adding the determined distance travelled for each segment.

6. The method of claim 1, wherein the discrete position fixes are obtained periodically.

7. A computing device for calculating a distance travelled, to monitor maintenance of a vehicle, the computing device comprising:
a processor; and
a communications subsystem,
wherein the computing device is configured to:
receive a plurality of discrete position fixes from a position sensor;
define a plurality of segments from the plurality of discrete position fixes based on a speed threshold;
for each segment, determine a first distance travelled by using a first calculation technique between successive discrete position fixes;
for each segment, determine a second distance travelled by using a second calculation technique between successive discrete position fixes;
for each segment, apply a first weight to the first distance travelled and a second weight to the second distance travelled; and
for each segment, determine the distance travelled using a weighted average of the first distance travelled and the second distance travelled wherein the first weight and the second weight are determined based on a speed traveled during the segment;
wherein the distance travelled is updated to determine whether distance thresholds are exceeded to generate an alert that maintenance is needed.

8. The computing device of claim 7, wherein the first calculation technique is a straight-line calculation between successive position fixes.

9. The computing device of claim 7, wherein the second calculation technique is a technique selected from a road based routing technique; a road based matrix technique; or a bias confirmation technique.

10. The computing device of claim 7, wherein the computing device is further configured to:
    determine a third distance travelled over the plurality of discrete position fixes by using a third calculation technique between successive discrete position fixes;
    apply a third weight to the third distance travelled; and
    use the weighted third distance travelled in the weighted average calculation.

11. The computing device of claim 7, wherein different segments use a different first weight and a different second weight.

12. The computing device of claim 11, wherein the computing device is further configured to calculate a total distance by adding the determined distance travelled for each segment.

13. The computing device of claim 7, wherein the discrete position fixes are obtained periodically.

14. A non-transitory computer readable medium for storing instruction code, which, when executed by a processor of a computing device, cause the computing device to:
    receive a plurality of discrete position fixes from a position sensor;
    define a plurality of segments from the plurality of discrete position fixes based on a speed threshold;
    for each segment, determine a first distance travelled by using a first calculation technique between successive discrete position fixes;
    for each segment, determine a second distance travelled by using a second calculation technique between successive discrete position fixes;
    for each segment, apply a first weight to the first distance travelled and a second weight to the second distance travelled; and
    for each segment, determine the distance travelled using a weighted average of the first distance travelled and the second distance travelled wherein the first weight and the second weight are determined based on a speed traveled during the segment.

* * * * *